US007177756B2

United States Patent
Moninger

(10) Patent No.: US 7,177,756 B2
(45) Date of Patent: Feb. 13, 2007

(54) METHOD, CONTROL APPLIANCE, AND COMPUTER PROGRAM FOR DETECTING DEFECTIVE PRESSURE SENSORS IN AN INTERNAL COMBUSTION ENGINE

(75) Inventor: Thomas Moninger, Eislingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/529,111

(22) PCT Filed: May 27, 2003

(86) PCT No.: PCT/DE03/01717

§ 371 (c)(1),
(2), (4) Date: Sep. 22, 2005

(87) PCT Pub. No.: WO2004/033882

PCT Pub. Date: Apr. 22, 2004

(65) Prior Publication Data

US 2006/0101903 A1   May 18, 2006

(30) Foreign Application Priority Data

Oct. 4, 2002   (DE) ............................... 102 46 320

(51) Int. Cl.
*F02D 41/22* (2006.01)
*G01L 27/00* (2006.01)
*G01M 15/05* (2006.01)
*G01M 15/09* (2006.01)

(52) U.S. Cl. ..................... 701/114; 73/1.59; 73/118.1

(58) Field of Classification Search ................. 701/34, 701/100, 114, 115, 102, 103; 73/117.2, 117.3, 73/118.1, 118.2, 119 A, 1.58, 1.59; 123/339, 123/323, 347, 348, 90.15, 339.23
See application file for complete search history.

(56) References Cited

U.S. PATENT DOCUMENTS

| 6,000,375 | A  | * | 12/1999 | Isobe ......................... 123/322 |
| 6,329,807 | B1 |   | 12/2001 | Pfitz et al. ................ 324/76.29 |
| 6,553,964 | B2 | * | 4/2003  | Arai et al. .................. 123/399 |
| 6,711,490 | B2 | * | 3/2004  | Kobayashi et al. ......... 701/102 |

FOREIGN PATENT DOCUMENTS

| DE | 199 46 874 | 4/2001 |
| DE | 100 21 639 | 1/2002 |
| EP | 1 245 812  | 10/2002 |

\* cited by examiner

*Primary Examiner*—Andrew M. Dolinar
*Assistant Examiner*—Johnny H. Hoang
(74) *Attorney, Agent, or Firm*—Kenyon & Kenyon LLP

(57) ABSTRACT

A method, a control unit, and a computer program for detecting a defective intake-manifold pressure sensor and/or a defective ambient-pressure sensor in an internal combustion engine having a variable valve timing are provided. The desired detection is carried out exclusively on the basis of a direct evaluation of the pressure upstream from the throttle valve and the pressure in the intake manifold. This method eliminates the need for deriving load signals from these pressures, at least for the determination as to whether at least one of the pressure sensors is defective.

14 Claims, 4 Drawing Sheets

METHOD, CONTROL APPLIANCE, AND COMPUTER PROGRAM FOR DETECTING DEFECTIVE PRESSURE SENSORS IN AN INTERNAL COMBUSTION ENGINE

FIELD OF THE INVENTION

The present invention relates to a method, a control unit, and a computer program for detecting a defective intake-manifold pressure sensor and/or a defective ambient-pressure sensor in an internal combustion engine.

BACKGROUND INFORMATION

An intake-manifold pressure sensor is used, for example, to diagnose the exhaust-gas recirculation in an internal combustion engine and therefore supplies important information for a control unit to control the internal combustion engine. A load signal representing the current load of the internal combustion engine, or the setting of a correct torque selected by the driver, may be derived from the pressure in the intake manifold. In addition, an optimum injection time in an internal combustion engine having throttle control may be ascertained from the load signal.

Because of the high importance of the intake-manifold pressure sensor during the operation of an internal combustion engine, it is desirable for defects in the intake-manifold pressure sensor to be diagnosed early.

Diagnostic methods for detecting the defectiveness of intake-manifold pressure sensors are known in the related art, but only in the case of conventional gasoline engines, in particular spark-ignition engines. The conventional internal combustion engines are distinguished in that their load control is implemented via the throttle valve, where there is a fixed relationship between the pressure in the intake manifold and the load, or between the throttle-valve angle and the load.

An example of such a diagnostic method for conventional spark-ignition engines is described, e.g., in published German patent document DE 199 46 874. Here, three different signals L1, L2, and L3 are produced from different operating parameters, L1 representing the mass flow rate of air that flows into an intake manifold of the spark-ignition engine, L2 representing the pressure in the intake manifold, and L3 representing a fuel signal ascertained from the mass flow rate of fuel. These signals are compared to each other in pairs and united to form combinations when variations occur. Different combinations of deviations are assigned different causes, i.e., different sources of error, for the deviations. Thus, e.g., in a first part of the method, it can initially be deduced that, when a particular deviation is present, either the intake-manifold pressure sensor and/or the exhaust-gas recirculation valve is defective. In a further part of the method, it may then be determined more accurately if the intake-manifold pressure sensor or the exhaust valve is defective. To this end, the pressure in the intake manifold during both the operation of the engine and its stoppage is measured and evaluated during the post-operation of the corresponding engine control unit. If the intake-manifold pressure is the same in both cases, it may be deduced that there is a defect in the intake-manifold pressure sensor; however, if the pressure in the intake manifold while the engine is stopped is less than that when the engine is being operated, it may then be deduced that an exhaust-gas recirculation valve is defective.

In addition, ambient-pressure sensors for use in internal combustion engines are known in the related art. In addition to the intake-manifold pressure sensors, they also supply important information for a control unit to control an internal combustion engine. Ambient-pressure sensors are used for, inter alia, ascertaining the maximum torque of the internal combustion engine. Diagnostic methods for ambient-pressure sensors are also known in the art. In conventional gasoline engines in which the load is controlled via the throttle valve, an ambient-pressure sensor can, however, only be checked for its correct method of functioning, i.e., plausibility-checked, while starting or during full load, since in conventional gasoline engines, a pressure that approaches ambient pressure is only present in the intake manifold under these conditions.

However, in internal combustion engines having variable valve timing, i.e., in internal combustion engines having throttleless load control, the load of the internal combustion engine is no longer controlled via the throttle valve and, therefore, via the pressure in the intake manifold, but rather via a change in its valve timing and/or its valve lift. The internal combustion engines having fully variable valve timing are distinguished by a lower fuel consumption than conventional gasoline engines.

FIG. 3 schematically illustrates such an internal combustion engine 100 having variable valve timing. Internal combustion engine 100 includes an engine block 110 having a piston 112, which moves up and down in it. Connected to the engine block is an intake manifold 120 having a built-in throttle valve 122 and an exhaust pipe 130. However, in contrast to conventional spark-ignition engines, throttle valve 122 is not used for controlling load. The control of the air supply and air exhaust through the intake manifold and the exhaust pipe, and therefore the control of the load of the internal combustion engine, is carried out via valves 140, which are controlled by a control unit 200, the control being implemented with the aid of fully variable timing edges. Instead of a single control unit 200, several control units interconnected by any communication link may also be used for controlling valves 140. The valves may be moved, for example, by electromagnetic or electrohydraulic actuators.

Control unit 200 includes an ambient-pressure sensor 210 for supplying a throttle-valve pressure signal, which represents pressure p_before_DK upstream from throttle valve 122. In this context, ambient-pressure sensor 210 does not directly supply pressure p_before_DK, but it primarily supplies only the ambient pressure, i.e., the air pressure upstream from air filter 150 of the internal combustion engine. Then, actual pressure p_before_DK upstream from the throttle valve may be subsequently derived in either ambient-pressure sensor 210 itself or control unit 200, by subtracting a pressure drop occurring in air filter 150 of the internal combustion engine from the measured ambient pressure.

In throttleless operation of the internal combustion engine, the pressure upstream from the throttle valve must be equal to the pressure in the intake manifold. An intake-manifold pressure sensor 220 is typically provided in the case of the control units of the related art. Intake-manifold pressure sensor 220 provides an intake-manifold pressure signal, which represents pressure p_intake in intake manifold 120 of internal combustion engine 100. Sometimes, they are additionally provided with an ambient-pressure sensor 210.

However, as explained above, since the load control in internal combustion engines having fully variable valve timing is no longer implemented via the throttle valve, all of the already known diagnostic methods for pressure sensors, which are based on deriving a load signal representing the load of the internal combustion engine from the angular position of the throttle valve or the pressure in the intake manifold, are no longer applicable to internal combustion engines having fully variable valve timing.

Therefore, an object of the present invention is to provide a method, a control unit, and a computer program for detecting a defective intake-manifold pressure sensor and/or a defective ambient-pressure sensor in internal combustion engines having fully variable valve timing.

SUMMARY

This object is achieved by the method, control unit, and program according to the present invention. In contrast to the related art, the present method dispenses with deriving load signals from the position of the throttle valve or from the intake-manifold pressure for detecting if at least one of two pressure sensors, namely the intake-manifold pressure sensor or the ambient-pressure sensor, is defective. Instead, the method of the present invention allows this detection to take place exclusively on the basis of a direct evaluation of the pressure upstream from the throttle valve and the pressure in the intake manifold.

According to an example embodiment, the method includes further steps, in order to be able to determine which of the two pressure sensors is defective. To this end, the internal combustion engine having throttleless load control is artificially shifted into an operating state, which simulates throttled load control. In the scope of this simulation, it is also possible to then derive simulated load signals from both the pressure in the intake manifold and the angular position of the throttle valve. According to the present invention, the simulated load signals are used for identifying the pressure sensor that is actually defective.

DETAILED DESCRIPTION

Figure 1A:
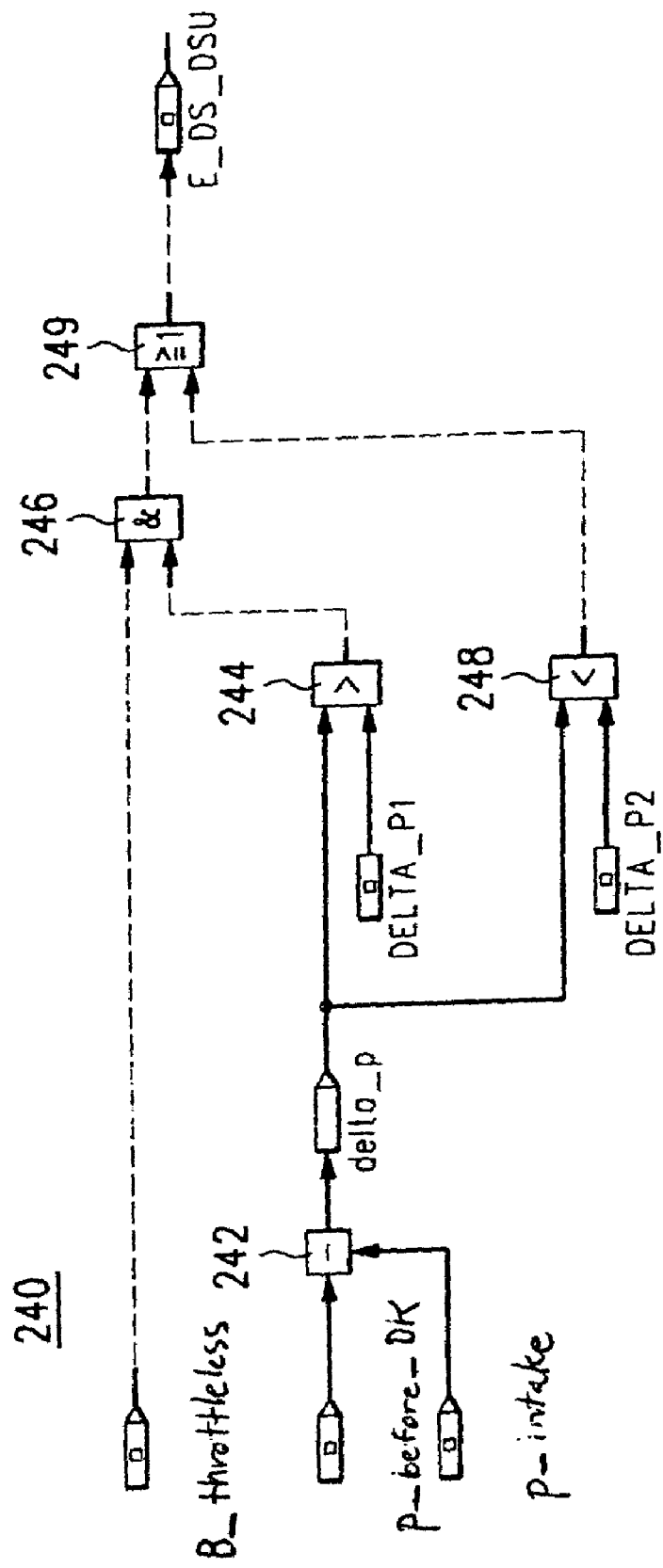
FIG. 1a shows an example embodiment of a method of the present invention for detecting defective pressure sensors in an internal combustion engine and a first logic module provided for implementing the method.
Figure 2:
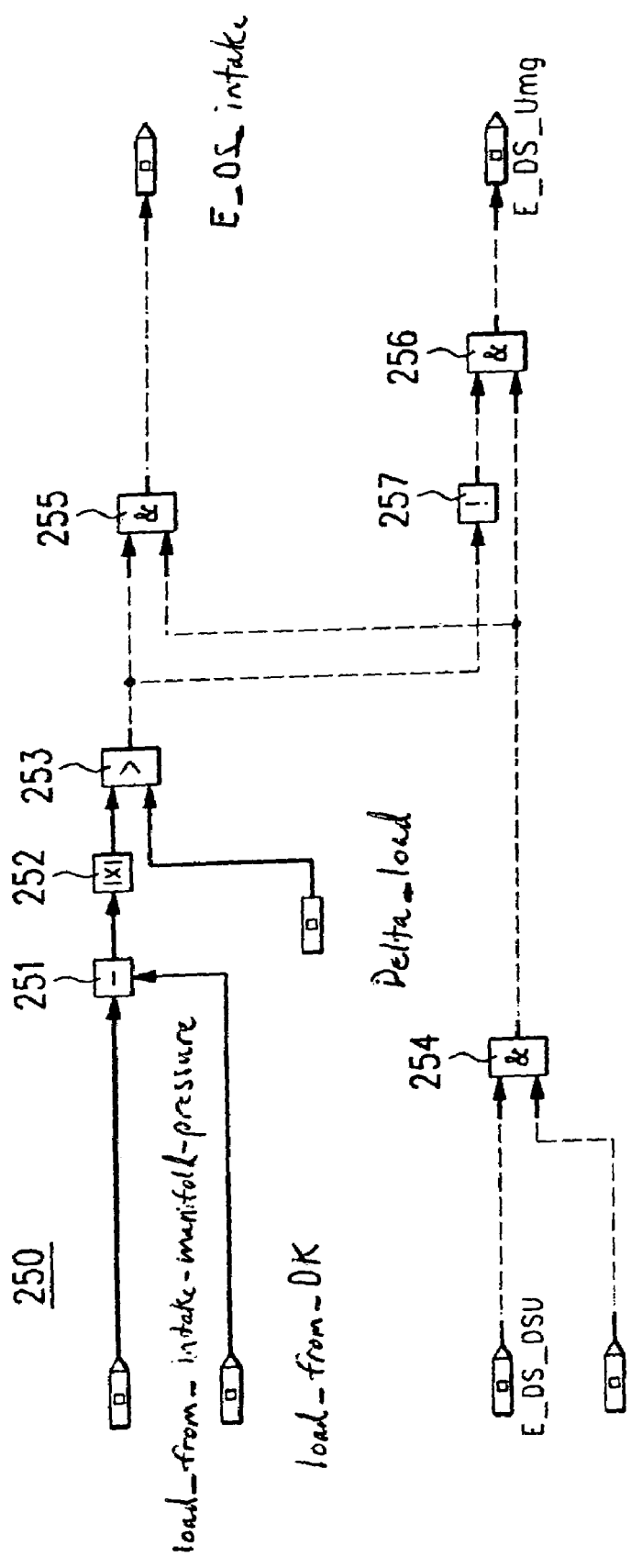
FIG. 2 shows another example embodiment of the method according to the present invention and a second logic module provided for implementing the further refinement.
Figure 3:
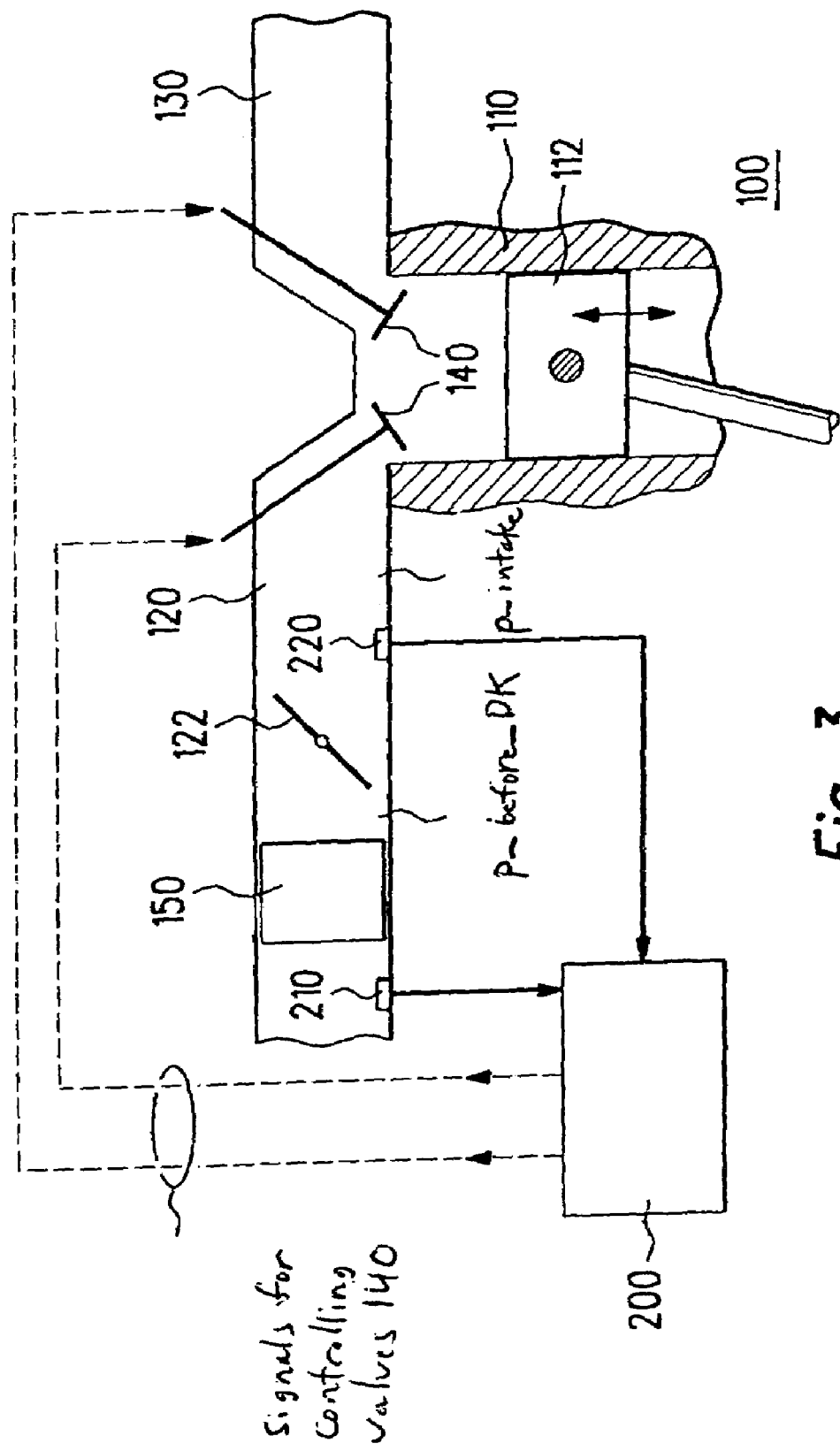
FIG. 3 shows a conventional internal combustion engine having variable valve timing, and a corresponding, conventional control unit for controlling the valves.

FIG. 1a illustrates a method for determining whether or not at least one of two pressure sensors, namely the intake-manifold pressure sensor and/or the ambient-pressure sensor, is defective in the case of an internal combustion engine having variable valve timing as shown in FIG. 3. The method steps illustrates FIG. 1a do not allow one to specifically determine which of the two pressure sensors is defective; such a determination may be made with the aid of further steps of the method described below with reference to FIG. 2.

Figure 1B:
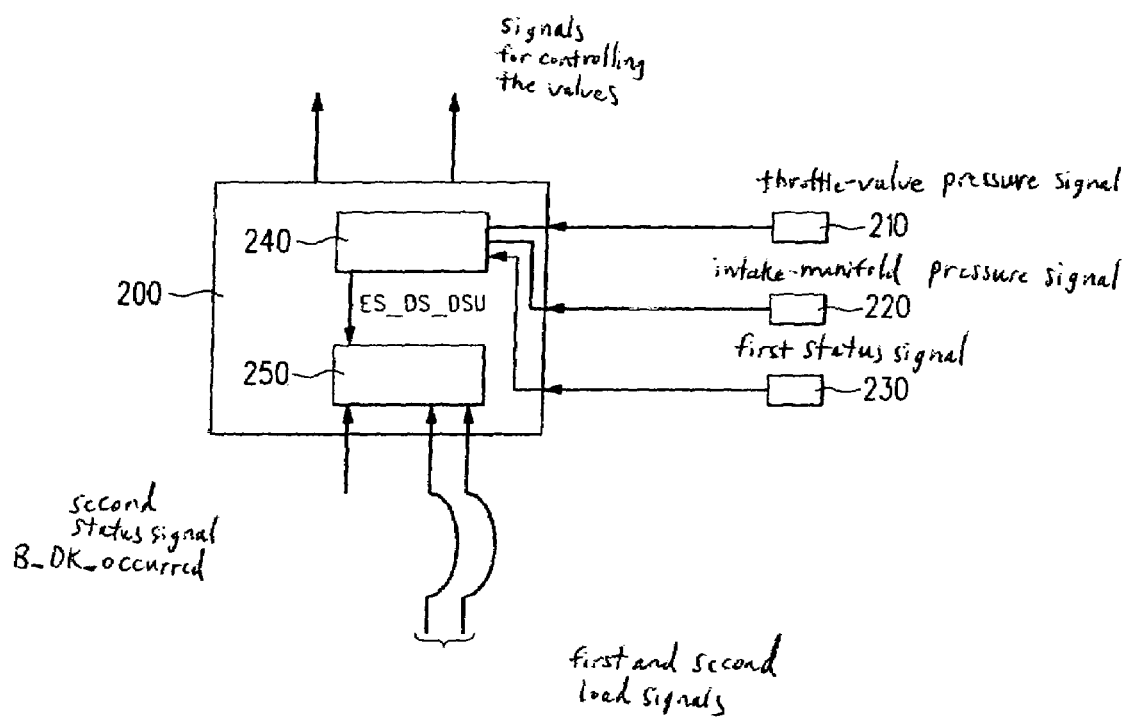
FIG. 1b shows an example embodiment of a control unit of the present invention.

The method is illustrated in FIG. 1a by showing the functional layout of a first logic module 240 according to the present invention, which may be a component of a control unit 200 for controlling the valves of internal combustion engine 100, which control unit 200 is shown in FIG. 1b. First logic module 240 allows the claimed method to be implemented. The layout of first logic module 240 is described below in detail; the individual steps of the claimed method may also be deduced from this.

According to FIG. 1a, first logic module 240 receives both a throttle-valve pressure signal, which represents pressure p_before_DK, and an intake-manifold pressure signal, which represents pressure p_intake in the intake manifold of the internal combustion engine. Generation of these signals is described below in connection with FIG. 3. According to the present invention, first logic module 240 also receives a first status signal from a first operating-state detector 230, the first status signal indicating whether or not the internal combustion engine is being operated in a throttleless operating state. As an alternative, the status signal may also be generated by another logic module inside control unit 200.

As shown in FIG. 1a, logic module 240 includes a first subtraction unit 242 for calculating a pressure difference delta_p by subtraction of the intake-manifold pressure signal from the throttle-valve pressure signal. This pressure difference is supplied to a first comparator unit 244, which determines if pressure difference delta_p is greater than a first threshold value Delta_P1. A first AND gate 246 ANDs the logical output signal of first comparator unit 244 and the first status signal. The output signal of this first AND gate 246 makes a first statement as to whether or not one of pressure sensors 210, 220 is defective; this is exactly the case, when pressure difference delta_p is actually greater than first threshold value Delta_P1 and internal combustion engine 100 is simultaneously being operated in a throttleless manner, as indicated by the first status signal. In this context, first threshold value Delta_P1 may be set to approximately zero.

Irrespective of this first statement, first logic module 240 includes a second comparator unit 248 for determining if pressure difference delta_p is less than second threshold value Delta_P2, where Delta_P2 may be zero. When this is the case, then, independently of the first statement, it is possible to make a second statement that one of the two pressure sensors 210, 220 is operating incorrectly. This statement is physically based on the fact that the pressure in intake manifold 120 can never be greater than the pressure upstream from throttle valve 122.

First logic module 240 also includes an OR gate 249 for ORing the output signal of first AND gate 246 and the output signal of second comparator unit 248. This OR operation is used for generating a first error signal E_DS_DSU, which represents an error in one of the two pressure sensors 210, 220, when such an error has already been detected at either the output of first AND gate 246 or at the output of second comparator unit 248 or at both outputs.

FIG. 2 illustrates another example embodiment, which is a further refinement of the method represented in FIG. 1, this further refinement being used to allow an exact determination as to whether the intake-manifold pressure sensor or ambient-pressure sensor 210 is defective. This further refinement is implemented in the form of a second logic module 250, which may be assigned to control unit 200 as well, as shown in FIG. 1b.

According to FIGS. 1b and 2, second logic module 250 implements the above-mentioned further refinement of the method by logically combining first error signal ES_DS_DSU, a first load signal load_from_intake-manifold-pressure, which represents the load of the internal combustion engine derived from the pressure in the intake manifold, and a second load signal load_from_DK, which represents the load of the internal combustion engine derived from the angular position of throttle valve 122.

To implement the further refinement of the method, an operating state that includes throttled load control is simulated in the internal combustion engine 100 having absolutely variable valve timing. To this end, valves 140 are controlled by control unit 200, using fixed timing edges. This special operating state is represented by a second status signal B_DK_occurred, which is likewise supplied to second logic module 250 as an input variable.

Second logic module 250 includes a second subtraction unit 251 for calculating a load difference by subtraction of the second load signal from the first load signal, as shown in FIG. 2. An absolute-value generator 252 calculates the absolute value of the load difference before this is supplied to a third comparator unit 253. Third comparator unit 253 determines if the absolute value of the load difference is greater than a third threshold value Delta_load.

A second AND gate 254 ANDs first error signal E_DS_DSU and second status signal B_DK_occurred. The output signal of second AND gate 254 is transmitted, together with the output signal of third comparator unit 253, to a third AND gate 255, which means that the output signal of third AND gate 255 represents the result of ANDing the mentioned, inputted signals. In other words: the output signal of third AND gate 255 represents a second error signal E_DS_intake, i.e., it indicates, if applicable, the defectiveness of intake-manifold pressure sensor 220. Such defectiveness is present, when the absolute value of the difference of the load of the internal combustion engine derived from the pressure in the intake manifold and the load derived from the angle of the throttle valve is greater than third threshold value delta_load, and when, in addition, the presence of a defect in at least one of the pressure sensors, ambient-pressure sensor 210 or intake-manifold pressure sensor 220, was simultaneously detected in the preliminary procedure described above with reference to FIG. 1a, and when an operation that includes throttled load control was simulated in internal combustion engine 100. The conclusion that the intake-manifold pressure sensor is defective is valid, since signal load_from_DK is reliably monitored by other diagnoses and is therefore correct.

Second logic module 250 further includes a fourth AND gate 256 for ANDing the output signal of comparator unit 253 inverted by an inverter 257 and the output signal of second AND gate 254, as shown in FIG. 2. The output signal of fourth AND gate 256 represents a third error signal E_DS_Umg, which indicates, if applicable, a defect in ambient-pressure sensor 210. Such a defect is present when the absolute value of the difference of the load of the internal combustion engine derived from the pressure in the intake manifold and the load derived from the angular position of the throttle valve is less than or equal to third threshold value Delta_load, and, at the same time, a defect in at least one of pressure sensors 210, 220 was already absolutely detected in the preliminary procedure described above with reference to FIG. 1, and an operation that includes throttled load control was simulated in the internal combustion engine.

Both the first and second logic modules may each be implemented independently of each other in the form of a hardware circuit.

The method of the present invention, and therefore also the first and/or second logic module 240, 250, may be implemented in the form of a computer program. In this context, the computer program is executable on a computing element, e.g., on a microprocessor in control unit 200, and is suitable for carrying out the method of the present invention. In this case, the present invention is therefore implemented by the computer program. The computer program may be stored in a memory element. In particular, an electrical storage medium, e.g., a random-access memory (RAM), a read-only memory (ROM), or a flash memory, may be used as the memory element.

What is claimed is:

1. A method for detecting a defect in at least one of an intake-manifold pressure sensor and an ambient-pressure sensor in an internal combustion engine having a variable valve timing, comprising:
    ascertaining a pressure upstream from a throttle valve of the internal combustion engine;
    ascertaining a pressure in an intake manifold of the internal combustion engine;
    calculating a pressure difference by subtracting the pressure in the intake manifold from the pressure upstream from the throttle valve;
    comparing the pressure difference to at least one of: a) a first threshold value during throttleless operation of the internal combustion engine; and b) a second threshold value during one of throttled and unthrottled operation of the internal combustion engine; and
    determining that at least one of the intake-manifold pressure sensor and the ambient-pressure sensor is defective, if at least one of: a) the pressure difference is greater than the first threshold value; and b) the pressure difference is less than the second threshold value.

2. The method as recited in claim 1, wherein at least one of the first threshold value and the second threshold value is set to a value of approximately zero.

3. The method as recited in claim 1, wherein after determining that at least one of the intake-manifold pressure sensor and the ambient-pressure sensor is defective, the method further comprising:
    adjusting the internal combustion engine to an operating state that simulates an operation having fixed timing and throttled load control;
    ascertaining a first load of the internal combustion engine from the pressure in the intake manifold;
    ascertaining a second load of the internal combustion engine from an angular position of the throttle valve;
    calculating a load difference by subtracting the second load from the first load;
    comparing an absolute value of the load difference to a third threshold value; and
    determining that the intake-manifold pressure sensor is defective, if the absolute value of the load difference is greater than the third threshold value, and determining that the ambient-pressure sensor is defective, if the absolute value of the load difference is one of less than and equal to the third threshold value.

4. The method as recited in claim 3, wherein the third threshold value is set to a value of approximately zero.

5. The method as recited in claim 1, wherein after determining that at least one of the intake-manifold pressure sensor and the ambient-pressure sensor is defective, the method further comprising:
    adjusting the internal combustion engine to an operating state that simulates an operation having fixed timing and throttled load control;
    ascertaining a first load of the internal combustion engine from the pressure in the intake manifold;
    ascertaining a second load of the internal combustion engine from a measuring signal of a hot-film air-mass flow-rate sensor;

calculating a load difference by subtracting the second load from the first load;

comparing an absolute value of the load difference to a third threshold value; and determining that the intake-manifold pressure sensor is defective, if the absolute value of the load difference is greater than the third threshold value, and determining that the ambient-pressure sensor is defective, if the absolute value of the load difference is one of less than and equal to the third threshold value.

6. A control unit for controlling an internal combustion engine having a variable valve timing, comprising:

an intake-manifold pressure sensor for providing an intake-manifold pressure signal that represents the pressure in an intake manifold of the internal combustion engine;

an ambient-pressure sensor for providing a throttle-valve pressure signal that represents the pressure upstream from a throttle valve;

a first operating state detector for providing a first status signal that represents a throttleless operating state of the internal combustion engine; and a first logic module for determining whether at least one of the intake-manifold pressure sensor and the ambient-pressure sensor is defective, by logically combining the intake-manifold pressure signal, the throttle-valve pressure signal, and the first status signal.

7. The control unit as recited in claim 6, wherein the first logic module comprises:

a subtraction unit for calculating a pressure difference by subtracting the intake-manifold pressure signal from the throttle-valve pressure signal;

a first comparator unit for determining whether the pressure difference is greater than a first threshold value;

a second comparator unit for determining whether the pressure difference is less than a second threshold value; and a first AND gate for ANDing a logical output signal of the first comparator unit and the first status signal.

8. The control unit as recited in claim 7, wherein the first logic module further comprises an OR gate for outputting a first error signal that represents a defect in at least one of the intake-manifold pressure sensor and the ambient-pressure sensor, the OR gate generating the first error signal by ORing an output signal of the first AND gate and an output signal of the second comparator unit.

9. The control unit as recited in claim 7, wherein the first logic module is configured as a hardware circuit.

10. The control unit as recited in claim 8, further comprising:

a second logic module for determining whether at least one of the intake-manifold pressure sensor and the ambient-pressure sensor is defective, by logically combining the first error signal, a second status signal that indicates whether the internal combustion engine is set to an operating state having fixed timing edges and throttled load control, a first load signal that represents a load of the internal combustion engine derived from the pressure in the intake manifold, and a second load signal that represents a load of the internal combustion engine derived from an angular position of the throttle valve.

11. The control unit as recited in claim 10, wherein the second logic module comprises:

a second subtraction unit for calculating a load difference by subtracting the second load signal from the first load signal;

an absolute-value generator for calculating an absolute value of the load difference;

a third comparator unit for determining whether the absolute value of the load difference is greater than a third threshold value;

a second AND gate for ANDing the first error signal and the second status signal;

a third AND gate for generating a second error signal that represents a defect in the intake-manifold pressure sensor, by ANDing an output signal of the third comparator unit and an output signal of the second AND gate;

an inverter for inverting the output signal of the third comparator unit; and a fourth AND gate for generating a third error signal that represents a defect in the ambient-pressure sensor, by ANDing the inverted output signal of the third comparator unit and the output signal of the second AND gate.

12. The control unit as recited in claim 11, wherein the second logic module is configured as a hardware circuit.

13. A computer-readable storage medium for storing a plurality of computer-executable instructions to be executed on a computing element of a control unit for controlling an internal combustion engine having a variable valve timing, wherein the instructions, when executed on the computing element, control a method for detecting a defect in at least one of an intake-manifold pressure sensor and an ambient-pressure sensor in an internal combustion engine having a variable valve timing, the method comprising:

ascertaining a pressure upstream from a throttle valve of the internal combustion engine;

ascertaining a pressure in an intake manifold of the internal combustion engine;

calculating a pressure difference by subtracting the pressure in the intake manifold from the pressure upstream from the throttle valve;

comparing the pressure difference to at least one of: a) a first threshold value during throttleless operation of the internal combustion engine; and b) a second threshold value during one of throttled and unthrottled operation of the internal combustion engine; and determining that at least one of the intake-manifold pressure sensor and the ambient-pressure sensor is defective, if at least one of: a) the pressure difference is greater than the first threshold value; and b) the pressure difference is less than the second threshold value.

14. The computer-readable medium as recited in claim 13, wherein the computer-readable storage medium is one of a diskette, a compact disk, and an EPROM.

* * * * *